United States Patent [19]

Aoki

[11] 4,065,941
[45] Jan. 3, 1978

[54] UNIVERSAL JOINT
[75] Inventor: Sadashiro Aoki, Tokyo, Japan
[73] Assignee: Koto Sangyo Kabushiki Kaisha, Tokyo, Japan
[21] Appl. No.: 578,173
[22] Filed: May 16, 1975
[51] Int. Cl. ............................................. F16d 3/16
[52] U.S. Cl. ..................................... 64/7; 64/8; 64/17 R; 64/2 P; 81/177 UJ
[58] Field of Search ................ 64/7, 8, 6, 2 P, 17 R; 81/177 UJ

[56] References Cited
U.S. PATENT DOCUMENTS

| | | | |
|---|---|---|---|
| 1,324,898 | 12/1919 | Hopcraft | 81/177 UJ |
| 2,051,085 | 8/1936 | Ilseman | 64/8 |
| 2,526,105 | 10/1950 | Adams | 64/7 |
| 2,780,079 | 2/1957 | Wahlberg | 64/7 |
| 2,895,314 | 7/1959 | Helm | 64/7 |
| 3,122,901 | 3/1964 | Thompson | 64/2 P |
| 3,522,713 | 8/1970 | Hayes | 64/17 R |

Primary Examiner—Samuel Scott
Assistant Examiner—Randall Heald
Attorney, Agent, or Firm—Koda and Androlia

[57] ABSTRACT

A universal joint adapted for use in high impact wrenches is disclosed. The universal joint comprises a tubular housing having a first end and a second end. A first ball joint having an input shaft with a ball member disposed at one end thereof and an attaching head disposed at the other end thereof is coupled to the tubular housing adjacent the first end thereof. A second ball joint having an output shaft with a ball member disposed at one end thereof and a socket head disposed at the other end thereof is coupled to the tubular housing adjacent the second end thereof. An external spring is disposed about the output shaft and journaled between the socket head and the second end of the housing. The external spring is arranged and configured on the universal joint so as to increase the flexibility of the second ball joint and to cause the second ball joint to return to axial alignment with the tubular housing after each use. Finally, an internal spring may also be disposed in the tubular housing journaled between the ball member of the first ball joint and the ball member of the second ball joint. The internal spring is positioned in the tubular housing so as to increase the axial flexibility of universal joint. By the use of the universal joint of the present invention, an especially flexible universal joint having desirable characteristics for assembly line methods is achieved.

7 Claims, 5 Drawing Figures

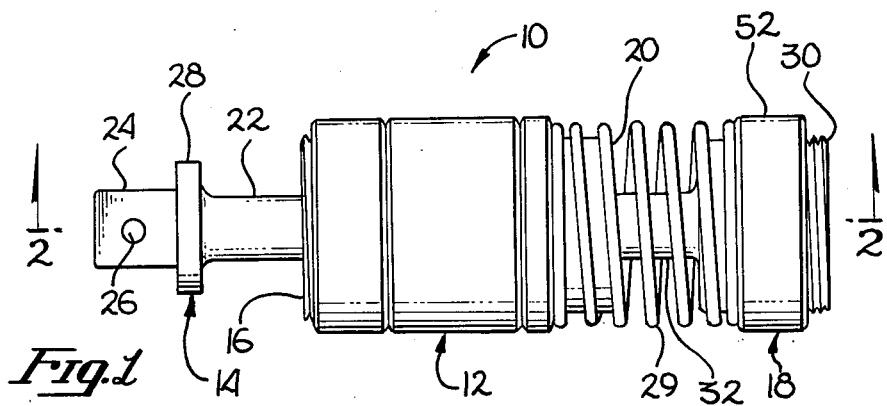
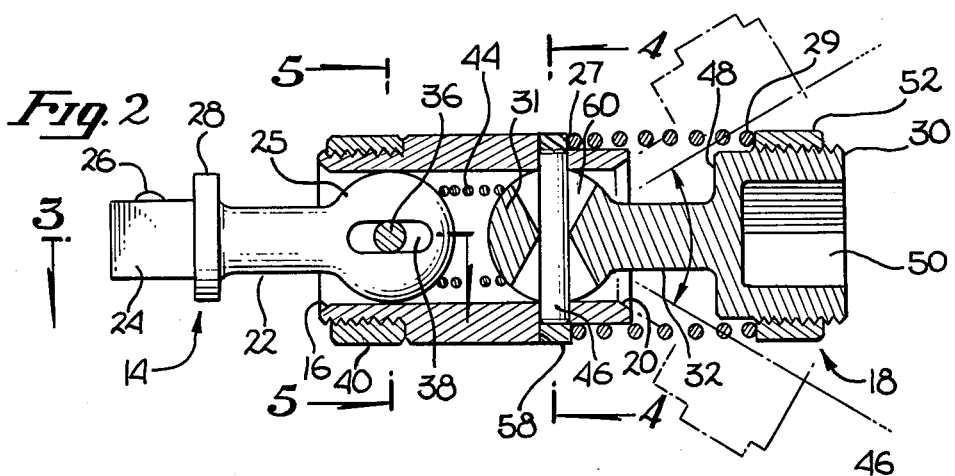
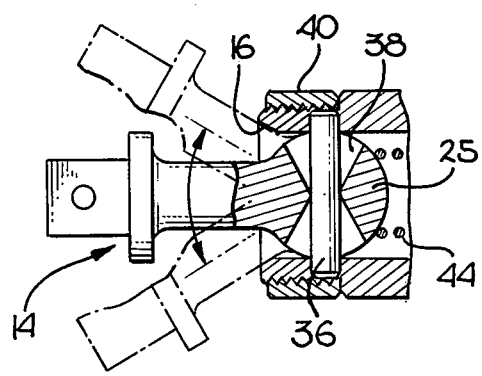
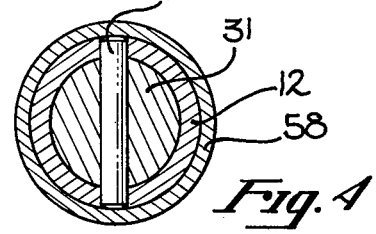
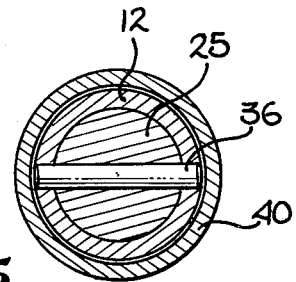

UNIVERSAL JOINT

BACKGROUND OF THE INVENTION

1. Field of the Invention

The present invention relates to universal joints, and more particularly, to such a joint used in combination with an impact wrench.

2. Prior Art

The use of universal joints in industry to tighten nuts by repeated blows automatically applied by compressed air and similar energy sources is well known in the art. One such example of use is in the automotive industry where nuts are applied and removed from tires. An air-driven impact wrench is usually coupled to a universal joint in order to remove the nuts or to tighten them quickly and easily. Other applications of this type include the tightening or removal of nuts and bolts from various other parts of the automobile. In such applications it is often very difficult for the user to obtain a proper grip of the bolt head with the universal joint. For example, many times the bolt to be removed is in a different axial alignment compared to the wrench and the universal joint. It thus becomes necessary for the user to remove other sections of the automobile such that proper axial alignment of the universal joint in the bolt to be removed can be obtained. If removal of a section is not possible, the user generally has to twist the universal joint so as to mate with the nut and then retwist the joint in order to remove it after the operation is completed. Such procedures have the obvious shortcoming in that they are time consuming.

In another application, where universal joints in impact wrenches have been extensively used, is in mass production, and more specifically, an assembly line system. In such a system, many times the part to be assembled comes on an automatic conveyor in front of the assembler. The assembler then inserts the bolt or nut and the like and attaches it by means of an impact wrench. Many times such bolts or nuts are inserted into the device such that the tool cannot be inserted in a straight line with respect to the nut or bolt. In such applications the user must twist or otherwise position the impact wrench so as to be in proper alignment with the nut to be removed or inserted. When the operation is completed, the joint must be retwisted so that it can be removed. While such twisting action may be achieved by various types of universal joints, there is still the problem of removal of the joint after each use. Today many assembly line operations are being automated and there is a need for the attaching head, or socket of the universal joint to be able to return to its original position after each use.

Other shortcomings of prior art universal joints are breakage due to the amount of axial forces applied to the device, and lack of "feel" when the device engages the nut or bolt.

One such prior art device which exemplifies these shortcomings is disclosed in McPeak, U.S. Pat. No. 3,855,884. McPeak teaches a conventional universal joint which is modified by an elongated output shaft having a sliding collar. The shaft carries a flange near its end to prevent removal of the collar. When the collar is slid from one position to another, the universal joint may be moved to various positions. It should be noted that such device has the obvious shortcoming in that it is only flexible at one end thereof. Thus, it can only be inserted or attached along the horizontal axis of the universal joint to the impact wrench. This prevents needed flexibility. Moreover, such device does not have an internal spring positioned between two ball joints to increase axial flexibility and retard breakage.

Another prior art impact wrench device is disclosed by Triplett et al., U.S. Pat. No. 3,779,105. Triplett discloses a fastener tool for use with special fasteners comprising a sleeve rigidly secured in a housing having a head engaging end extending from the housing, and a socket rotatably secured to the sleeve. A spring is also disposed in the housing in order to increase the flexibility of the device. However, such device suffers from the shortcoming in that each end thereof must be in the same alignment with the impact wrench for proper use. Thus, it cannot easily be attached to a bolt at various angles, and there is no external spring which may be modified and controlled.

The present invention provides a universal joint which is flexible at each end thereof and which has increased flexibility because of various internal and external springs disposed therein. By the use of the present invention, the socket head returns to its original position after each use. Moreover, the socket head and the attaching head may be rotatably positioned thus permitting the universal joint of the present invention to be used in a wide range of applications without requiring the impact wrench to occupy the same axial direction as the bolt to which the universal joint is attached.

SUMMARY OF THE INVENTION

A universal joint is described particularly adaptable to be selectively coupled to hammers and impact wrenches such as are well known in the art. The universal joint of the present invention comprises:

i. a tubular housing having first and second ends with an outwardly protruding center section forming an external ledge adjacent said ends;

ii. a first ball joint having an input shaft with a ball member disposed at one end thereof and an attaching head disposed at the other end thereof. Adjacent the attaching head is an outward extending flange member. The flange member prevents the impact wrench from proceeding down the input shaft beyond a predetermined point. There is also disposed on the attaching head a fastening means, such as, for example, a spring-loaded button member. Such fastening means are well known in the art. The ball member of the first joint is rotatably coupled to the tubular housing adjacent to the first end thereof;

iii. a second ball joint having an output shaft with a ball member disposed at one end thereof and a socket head disposed at the other end thereof. The socket member of the second ball joint has a generally outwardly extending section attached at the end of the output shaft forming a cavity in the center thereof. The cavity is arranged and configured so as to be selectively disposed about the head of a nut or bolt and the like. The ball member of the second ball joint is likewise rotatably coupled to the tubular housing adjacent the second end thereof; and iv. an external helical compression spring disposed about the output shaft and journaled between the socket head and the second end of the housing. The external spring is arranged and configured on the universal joint so as to increase the flexibility of the second ball joint member and to cause the ball joint member to return to its original position after each use in axial alignment with the tubular housing. There may also be disposed in the universal joint of the present invention, an internal spring. The internal spring is disposed in the tubular housing so as to be journaled between the ball member of the first ball joint and the ball member of the second ball joint. The internal spring is also a generally helical coil compression type spring. The function of the internal spring is to increase the longitudinal flexibility of the first and second ball joint thereby retard breakage and increase the useful life of the device. It also enables the user to have a "feel" of forcing down the universal joint on a bolt and rotating the bolt in the desired manner.

It is therefore one object of the present invention to provide a universal joint which is adapted to be used with an impact wrench and which has two outwardly extending ball members disposed therein.

Another object of the present invention is to provide a universal joint which is strong, rugged, yet inexpensive and easy to use, and contains a few number of relatively easily produced parts.

Yet another object of the present invention is to provide a universal joint with two outwardly extending ball members disposed therein and an external spring for increasing the flexibility of the second ball joint member and causing the second ball joint member to return to its original position after each use.

The novel features which are believed to be characteristic of the invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the invention.

BRIEF DESCRIPTION OF THE DRAWINGS

FIG. 1 is a plane view of the universal joint of the present invention showing the tubular member, the first and second ball joints disposed therein, and the external spring.

FIG. 2 is a cross-sectional view of the universal joint of the present invention taken along section lines 2—2 of FIG. 1 to illustrate the means used to couple the ball members of the first and second ball joints to the tubular housing and to show the internal spring member disposed between the respective ball members.

FIG. 3 is a partial cross-sectional view of the first ball joint taken along section lines 3—3 of FIG. 1 showing, by hidden lines, the rotating action of the first ball joint.

FIG. 4 is an end cross-sectional view of the second ball joint taken along lines 4—4 of FIG. 2 and the pin means used to ratatably couple the second ball joint to the housing.

FIG. 5 is an end cross-sectional view taken along lines 5—5 of FIG. 2 showing the means used to rotatably couple the first ball joint to the tubular housing.

DETAILED DESCRIPTION OF THE INVENTION

Referring first to FIG. 1, there is shown, as a presently preferred embodiment, a tubular housing 12 with a first ball joint 14 and a second ball joint 18 disposed therein. The first and second ball joints 16 and 18 are disposed in the tubular housing 12 so as to be in coaxial alignment with respect to each other on the housing 12 when in the normal, unflexed state. However, it should be noted that each of the ball joints may be rotated to enable the user to use the universal joint 10 of the present invention in a wide range of uses and configurations. The first ball joint 14 is disposed in the first end 16 of the tubular housing 12 and extends outward therefrom. The first ball joint 14 has an input shaft 22 with a ball member 25 disposed at one end thereof and an attaching head 24 disposed at the other end thereof. The attaching head has a spring-loaded fastening member 26 disposed therein. Such members are well known in the art and enable the input shaft to be easily and securely coupled to an impact wrench and the like. An outwardly extending flange member 28 is disposed adjacent the attaching head so as to prevent undesired travel of the impact wrench down the input shaft 22.

The second ball joint 18 is disposed in the second end 20 of the tubular housing 12 and extends outward therefrom. The second ball joint 18 has an output shaft 32 with a ball 31 disposed at one end thereof and a socket member 30 disposed at the other end thereof. The first and second ball joints 14 and 18 are disposed in said housing 12 such that the shafts of each extend outward therefrom. In the presently preferred embodiment, such ball joints are made of alloy steel and the like.

An external helical spring member 29 is disposed about the output shaft 32 and is journaled or otherwise positioned between the second end 20 of the tubular housing 12 and the socket member 30 of the second ball joint 18. This external spring 29 represents the point of novelty of the present invention. External spring 29 enables the second ball joint 18 to be flexible and causes the joint 18 to return to its original position after use. For example, in a typical assembly line system, once the user has disconnected the socket 30 from desired bolt after the operation is completed, and removes the universal joint 10 therefrom, the second ball joint 18 would be returned to its approximate original position in axial coalignment with the tubular housing 12 because of the compressive outwardly extending force exerted by external spring member 29.

Now referring to FIG. 2, the internal workings of the tubular housing 12 and each of the ball joints 14 and 18 are clearly shown. First ball joint 14 is disposed in the tubular housing 12 adjacent the first end 16 thereof. It is rotatably secured to the housing by pin member 36, although other means for rendering ball joint 14 rotatable are also within the scope of this invention. Pin member 36 is disposed through ball 25 through an opening 38. As shown in FIG. 3, pin 36 is disposed across ball 25 through opening 38 and permits the first ball joint 14 to be rotatable thereabout as shown by the phantom lines. Pin 36 is secured in the tubular housing 12 and is held in position by collar 40. Collar 40 represents another unique aspect of the present invention. Collar 40 is removable from the first end 16 of the tubular housing 12. This enables the first ball joint 14 to be easily removable therefrom should the ball joint become damaged or should a different size shaft or attaching head be desired. For example, one need only unscrew collar 40 thereby exposing pin 36. Once pin 36 is removed from the housing 12 through a hole disposed therethrough, first ball joint 14 may then be retracted out of tubular housing 12 through end 16.

Referring again to FIG. 2, one can see that disposed between ball 25 of the first ball joint 14 and ball 31 of the second ball joint 18 is an internal spring 44. Internal spring 44 is of a general helical construction and is of the compression type such that a force is exerted outward from the center thereof on the first and second ball joints respectively. Such internal spring 44 also represents a point of novelty of the present invention and a distinct improvement over the prior art. Because the first and second ball joints 14 and 18 respectively are held under a constant force, there is less likelihood of any breakage of either of the ball joints because of undesired movement in the tubular housing 12, or the ball joints. Moreover, internal spring 44 permits the user to obtain a positive feel between the force exerted upon the first ball joint 14 and that exerted by the second ball joint 18 on the desired bolt or nut.

The second ball joint 18 is also rotatably secured to the housing 12 by a pin 46. Other means for securing the second ball joint 18 to the housing so as to render the ball joint rotatable therein are also within the scope of this invention. The flexibility and rotation of second ball joint 18 is shown in FIG. 2 by phantom lines. Disposed about pin 46 is a collar 58 which is removable therefrom. This collar 58 enables the user to easily remove the second ball joint 18 from the housing should a different size socket be desired or should the second ball joint break and replacement be necessary. Once pin 46 is removed from the tubular housing 12 the second ball joint 18 may be disposed outward from the second end 20 thereof. The collar 58 also forms a ledge 27 against which an external spring is disposed. A similar collar 52 is circumferentially disposed about the socket 30 and forms another ledge which abuts against spring 29 such that spring 29 is journaled between ledge 27 formed by collar 58 and ledge formed by collar 52. It should be noted that collar 52 may be positioned at various points on the socket 30 enabling various tensions of the spring to be utilized. Other means for securing spring 29 about shaft 32 so as to render ball joint 18 flexible is within the scope of this invention.

Socket 30 is of a general configuration as is well known in the art and has a cavity 50 disposed therein which is arranged and configured so as to selectively engage a bolt head and the like. A typical configuration for cavity 50 is of a square or hexagonal cross-section. While the presently preferred method of construction is to make the socket 30 and the shaft out of one continuous piece of steel alloy, various rotation socket heads as are well known in the art may also be attached at the end of output shaft 32.

Referring now to FIGS. 4 and 5, one can see the specific means used to secure each of the ball joints into the housing 12. For example, FIG. 4 is a cross-sectional view of the means used to secure the second ball joint member 18 in the tubular housing 12. Pin 46 is disposed through ball member 31 and held in place by means of collar 58. Upon removal of collar 58 the pin 46 may be slid outward from the tubular housing 12 so as to enable ball 31 to be disposed outward therefrom. In FIG. 5, a substantially similar pin 36 is also held in place by a collar 40. Again, removal of collar 40 will permit one to remove pin 36 thus freeing ball 25 of the first ball joint 14.

There has been described a uniquely designed universal joint which is adapted for use with an impact wrench. The two ball joints 14 and 18 respectively are each disposed in the tubular housing with the ball members disposed in the housing and the respective shafts extending outwardly therefrom. Because of the positioning of the external spring member 29 and the internal spring member 44 a universal joint having desirable qualities is achieved. Spring 29 is arranged and configured to cause the second ball joint 18 to return to its original position after each use. Moreover, because spring 29 is external, it can be easily replaced without disassembly of the entire universal joint.

Although this invention has been described and disclosed with reference to a particular embodiment, the principles involved are susceptible of other applications which will be apparent to persons skilled in the art. For example, the universal joint of the present invention can be utilized by using either of the internal spring 44 or the external spring 29 and not necessarily both springs at the same time. However, use of both springs at the same time does substantially improve the operation of the universal joint. This invention, therefore, is not intended to be limited to the particular embodiment herein disclosed.

I claim:

1. A universal joint adapted for use in in impact wrenches comprising:
    a. Tubular housing having first and second ends;
    b. A first ball joint having an imput shaft with the ball member disposed at one end thereof and an attaching head disposed at the other end thereof, said ball member of said first ball joint coupled to said tubular housing adjacent said first end thereof;
    c. A second ball joint having an output shaft with a ball member disposed at one end thereof and a socket head disposed at the other end thereof, said ball member of said second ball joint coupled to said tubular housing adjacent said second end thereof;
    d. An external spring means disposed about said output shaft and journaled between said socket head and said second end of said housing, said external spring means for increasing the flexibility of said second ball joint;
    e. On internal spring means within said tubular housing and journaled between said first and second ball members thereby increasing the longitudinal flexibility of said universal joint.

2. The universal joint according to claim 1 wherein said first and second ball joints are rotatably coupled to said tubular housing.

3. A universal joint adapted to be secured to an impact wrench comprising:
    a tubular housing having first and second ends;
    a first ball joint having an input shaft with a ball member disposed at one end thereof and an attaching head disposed at the other end thereof, said ball member of said first ball joint coupled to said tubular housing adjacent said first end thereof;
    a second ball joint having an output shaft with a ball member disposed at one end thereof and a socket head disposed at the other end thereof, said ball member of said second ball joint coupled to said tubular housing adjacent said second end thereof;
    an internal spring means disposed in said tubular housing journalled between said ball member of said first ball joint and said ball member of said second ball joint, said internal spring means for increasing the longitudinal flexibility of said first and second ball joints;
    an external spring means disposed about said output shaft and journalled between said socket head and said second end of said housing, said external spring means for increasing the flexibility of said second ball joint member; and a pin means for rotatably coupling said first and second ball joints to said tubular housing.

4. The universal joint according to claim 3 wherein said tubular housing has a ledge member adjacent said second end thereof and said external spring abutting against said ledge member.

5. The universal joint according to claim 3 wherein said socket head has a collar member circumferentially disposed thereabout, said collar member forming an outward extending ledge, said external spring member abutting adjacent said ledge formed by said collar member.

6. The universal joint according to claim 3 wherein said pin means are disposed generally perpendicular with respect to each other.

7. A universal joint adapted for use in impact wrenches comprising:

a tubular housing having first and second ends;

an input shaft having an attaching head at one end and a first ball member at the other end, said ball member being inserted within said first end of said tubular housing and coupled to said tubular housing adjacent said first end;

an output shaft having a socket head at one end and a second ball member at the other end, said ball member being inserted into said second end of said tubular housing and coupled to said tubular housing adjacent said second end;

an internal spring means within said tubular housing and journaled between said first and second ball members thereby increasing the longitudinal flexibility of said universal joint; and an external spring means about said output shaft and journaled between said socket head and said second end of said housing.

* * * * *